United States Patent [19]

Bieri

[11] 4,013,133

[45] * Mar. 22, 1977

[54] APPARATUS WITH A MOTOR-DRIVEN MATERIAL REMOVING TOOL, ESPECIALLY FOR CUTTING CONCRETE, STONE OR THE LIKE

[76] Inventor: Hans Bieri, Toedistrasse 9, 8330 Pfaeffikon, Switzerland

[ * ] Notice: The portion of the term of this patent subsequent to Oct. 28, 1992, has been disclaimed.

[22] Filed: Aug. 7, 1975

[21] Appl. No.: 602,633

Related U.S. Application Data

[63] Continuation of Ser. No. 462,801, April 22, 1974, abandoned.

[52] U.S. Cl. .................................. 173/32; 60/486; 60/489; 60/DIG. 10; 175/211

[51] Int. Cl.$^2$ .................. B23B 45/04; B23B 45/14; E21C 11/00

[58] Field of Search ............... 173/33, 32; 175/211; 60/325, DIG. 10, 488, 486, 489

[56] References Cited

UNITED STATES PATENTS 3,351,143 11/1967 Seibold et al. ....................... 75/209
3,550,701 7/1969 Holley ............................ 173/33 X
3,682,253 8/1972 McIntosh et al. ............... 173/43 X
3,819,153 6/1974 Hurst et al. ................... 60/DIG. 10

*Primary Examiner*—Ernest R. Purser
*Assistant Examiner*—William F. Pate, III
*Attorney, Agent, or Firm*—Wolfgang G. Fasse; Willard W. Roberts

[57] ABSTRACT

An apparatus with a motor driven material removing tool for cutting, drilling, milling, sawing or grinding of concrete, stone or the like. The apparatus comprises three spaced apart operational groups, namely a working group, a vacuum source and control group, and a driving group. The groups are mobile and interconnectable and disconnectable by hoses and electrical cables. The working group comprises an interchangeable tool, such as a drill, drive motor means for driving and advancing the tool, and a tool holding device mounted on the outside of a rigid suction bell. The vacuum and control group includes vacuum producing means and electrical and fluid control units. The driving group has at least one hydraulic pressure pump with motor means for generating the hydraulic power for driving and advancing the tool.

4 Claims, 4 Drawing Figures

APPARATUS WITH A MOTOR-DRIVEN MATERIAL REMOVING TOOL, ESPECIALLY FOR CUTTING CONCRETE, STONE OR THE LIKE

CROSS REFERENCE TO OTHER APPLICATIONS

The present application is a continuation application of my copending application Ser. No. 462,801 filed Apr. 22, 1974 now abandoned.

BACKGROUND OF THE INVENTION

The present invention relates to an apparatus with a motor-driven material removing tool for mechanical treating concrete, stone or the like. More specifically the invention relates to an apparatus for cutting or boring concrete walls in buildings or the like.

When boring or similar mechanical working processes have to be carried out on concrete walls or the like, it is necessary to press the working tool against the working surface with a certain force to make a cut. In the case of large bore diameters for economic working it is no longer sufficient to apply this pressure force by hand. On the other hand, mechanical support e.g. at a front wall in many cases, as for demolition objects, is not possible or only possible by using large effort. The idea of using a reduced pressure suction bell as described in my co-pending patent application Ser. No. 408,798 to apply the required feed force, on the other hand, brings with it the problem that a relatively large, powerful suction blower is required in order to maintain permanently the necessary reduced pressure in the interior of the suction bell. This blower, together with the drive motor for moving and advancing the working tool, is rather heavy. For the drive and feed of the working tool comparatively high outputs are needed so as to be able to work economically with such equipment at all. This high output requirement then has the consequence that strong and thus heavy motors and pumps are necessary. When all these units would be incorporated into a single apparatus, the latter becomes so heavy and unwieldy that its putting into use in many cases becomes questionable because e.g. it has to be taken through narrow staircases of buildings and to be applied to vertical walls.

OBJECTS OF THE INVENTION

In view of the foregoing, it is the aim of the invention to achieve the following objects singly or in combination:

to provide an apparatus which overcomes the drawbacks of the prior art as outlined above;

to provide an apparatus of said character of great power and efficiency and quick action which is divided in several spaced apart working groups, so that it is capable of use in cramped spaces and is convenient for transportation and into and out of a building, to provide an apparatus which is easily manipulated and controlled for actuating a tool in either direction, to provide an apparatus containing several working groups, one of which having a tool holding device and a suction bell which can be positioned temporarily against more or less flat surfaces practically in any desired position by means of suction.

SUMMARY OF THE INVENTION

According to the invention there is provided an apparatus with a motor-driven material removing tool, especially for cutting concrete, stone or the like, comprising three spaced apart, interconnectable and disconnectable operational groups, a working group to which the working tool is connectable and which includes a drive motor for driving said tool, a tool holder for interchangeable fixing said tool, a feed-advance unit for said tool, a suction device, and supporting means for supporting said tool holder to said suction device, a reduced pressure producing and control group adapted to be connected by pressurised by at least one fluid line and at least one electric cable with said working group, including reduced pressure producing means and control means and control means for controlling the power to said drive motor and to said feed-advance unit, a driving group with at least one motor and at least one fluid line and at least one electric cable for connecting the driving group to said reduced pressure producing and control group.

The invention has the advantage that the separation into a plurality of the connectable and disconnectable groups enables the application of great power to the tool whereby the individual groups are convenient for transportation to and from the job.

BRIEF FIGURE DESCRIPTION AND DETAILED DESCRIPTION

In order that the invention may be clearly understood, it will be described, by way of example, with reference to the accompanying drawings, wherein.

Figures 1, 2, 3, 4:
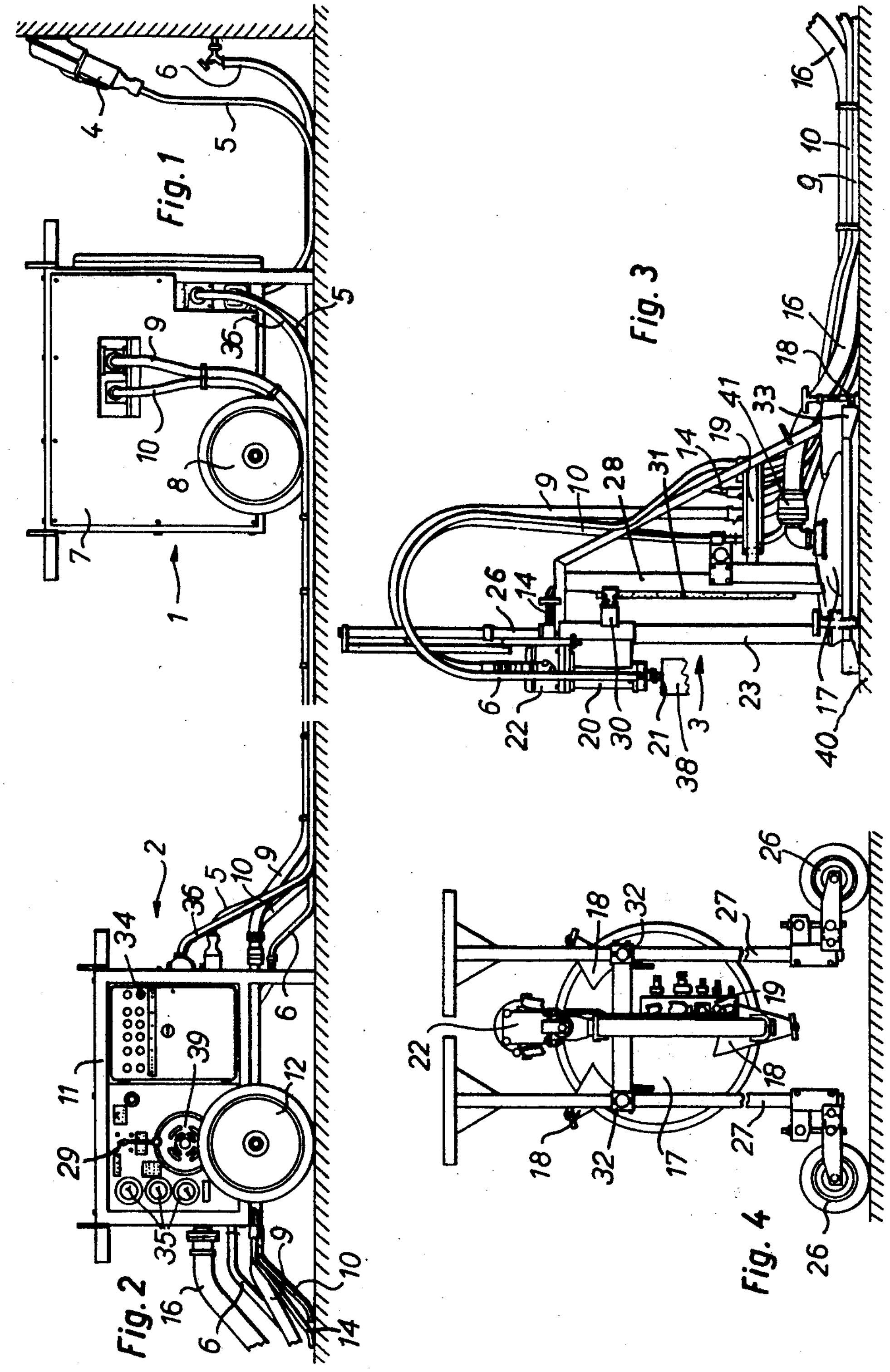
FIG. 1 is a side view of a driving group, according to the invention.
FIG. 2 is a side view of a control and reduced pressure producing group, according to the invention.
FIG. 3 is a side view of a working pump, according to the invention.
FIG. 4 is a plan view of a frame for the working group of FIG. 3 with which the suction bell can be secured to a vertical wall.

The present invention comprises three individual groups which are working operatively together:

a driving group 1 illustrated in FIG. 1; a control group 2 according to FIG. 2; and a working group 3 according to FIG. 3. These groups are interconnected with hose lines and electric cables.

The driving or motor group 1, which is built in the form of a mobile car 7, contains three parallel-working hydraulic pumps each with an associated electric motor. These motors may be switched in or out individually in response to the hydraulic power needed. They are located in the interior of the car 7 which is provided with wheels 8 so that it is readily displaceable. The current supply to the electric motors takes place by way of an electrical cable 5 connected to a current junction 4. Pressurised oil generated from the hydraulic pumps is conveyed through a flexible hose 10. The return oil is conveyed in a second flexible hose 9. In accordance with the required output from the working tool, all or only some of the pumps are working or are coupled with a common drive motor. A flexible hose 6 is conveying water from a water source to the car 7 for cooling the hydraulic return oil and the tool. The flexible oil hoses 9 and 10 are connected with the control group.

An electric cable 36 leads also from the drive group 1 to the control group 2. This control group contains at least one hydraulic pump driven by an electric motor. This pump effects the advance of the working tool with a feeding device. Also in this control group 2 are electrical and hydraulic control devices 29, 34 and indicating instruments 35 for the stepless hydraulic feed of the tool 38 and for the control of the drive group 1. In addition, there is in this control group and reduced pressure producer 39 or vacuum source which is essentially an air suction pump for producing the necessary reduced pressure inside a suction bell 17 of the working group 3 whereby to achieve that the suction bell 17 is held fast at a wall 40 or the like. The control group 2 has also the form of a mobile car 11 with a pair of wheels 12. A hose 16 of relatively large diameter extends from the reduced pressure producer 39 of the control group 2 to the vacuum bell 17 of group 3 so as to maintain in operation the necessary reduced pressure inside of the bell 17. The control group 2 further contains two hoses 9, 10 connected with group 3, namely one hose 9 for the delivery of pressurised oil and one hose 10 for the return oil from the hydraulic motor. For the releasable connection of the hoses, corresponding rapid release hose couplings are provided at the groups.

The hoses 6, 9, 10, 14 and 16 shown broken at the left of FIG. 2 must be considered as continued on the right of FIG. 3.

The working group 3 shown in FIG. 3 contains a suction bell 17 and a tool holder 21 for fixing a drill 38. More details of the working group 3 are shown in my co-pending application Ser. No. 408,798 to which reference may be had. The rigid vacuum bell 17 is provided at the side of the wall 40 with an elastic sealing ring 33 and has three legs or feet 18 of adjustable height adapted to rest on the ground or on a wall 40 so as to limit the deformation of the sealing ring 33 on unevennesses of the ground. The suction bell 17 consists of a convex, rigid sheet metal piece and is secured to a frame 28 extending vertically upwardly from the bell 17. There is also a vertical hollow post 23 on which a head 20 is secured adjustable in height. The head contains a hydraulic motor 22 connected to the oil-supplying hose 10 and an oil return hose 9. This head 20 is provided with a rotary tool spindle 21 in which a working tool 38 is insertable, preferably a relatively large-diameter, tubular boring tool with a crown made of hard metal. The drive for the rotational movement of this working tool 38 is provided by the hydraulic motor 22 with the aid of the pressure oil contained in the hose 9, 10 supplied from the drive group 1. The available output at the spindle 21 may amount to 5–18 HP, preferably about 10 HP. The feed advance of the working tool 38 is effected by a hydraulic feed advance unit 26 which comprises essentially a vertical, double-acting cylinder-piston unit so that the head 20 together with the drive motor 22 can be displaced up and down along the post 23 secured by vertical guides 31. Relative rotation between the head 20 and the frame 28 is prevented by an extension 30 projecting horizontally from the head 20 and engaging the guide 31 of the frame 28. The control means and instruments for the feed advance of the tool 38 are arranged in the control group 2. The advance of the tool 38 is effected by a double acting piston inside of the post 23. The hydraulic oil for the feed advance unit 26 is conducted in two hoses 14.

The hydraulic hoses leading from the control group 2 are releasably secured in the working group 3 to a collecting block 19 by means of quick-release couplings and there they are distributed to the associated units. In this way the whole bundle of hoses can be quickly unfastened and refastened between the different groups.

The hose 16 for producing reduced pressure in the interior of the suction bell 17 is also provided with a hose coupling 41 near the suction ball 17.

In FIG. 4 there is shown an additional supporting device for the working group 3 with which the suction bell 17 can be set on a vertical wall. This support device has the function of an auxiliary carrier to prevent the suction bell 17 from falling off when for any reason there is an interruption of current supply or failure of vacuum. Here too, the actual pressing force against the wall is still produced by reduced pressure inside the suction bell. The two posts 27 of this support device are provided at the bottom with wheels 26′ and are clamped by clamp devices 32 either directly to the suction bell 17 or via supports connected to the latter.

The suction source is continuously connected to the suction bell 17 during the entire working operation in order to compensate for leakage looses between the pressure relieved sealing ring 33 of the suction bell 17 and the supporting surface 40, especially if the supporting surface is rough or uneven. A very stable supporting of the entire structure is achieved because the suction bell 17 does not rest on the elastic sealing ring 33, but rather on the three rigid supporting feet 18 which take up the contact force resulting from the evacuation of the suction bell 17. The reduced pressure or vacuum which is produced inside the suction bell 17 should be at least 0,1 atm. As a result the available contact force is sufficient for applying to the tool 38 inserted in the head 21 a substantial feed advance force. It is possible to attach group 3 not only to a floor or to a horizontal wall, but also to vertical walls or even to ceilings in order to drill holes or to perform any other material removing machinery or cutting operations.

The working group 3 may contain a boring or drilling tool, a compass saw or a circular saw in order to produce breaches, openings, slots or bores in building walls, by example for water pipes, ventilation channels or the like.

Through the separation of the actual drive and control devices from the working group 3, it is so light that it can readily carried normally by two men and it becomes possible to arrange this working group 3 at vertical walls or in narrow space conditions. The connecting hose 16 can nevertheless be kept relatively short so that pressure losses can be reduced to an acceptable level. The relatively heavy motor and pumps for driving the tool 38 can be set up remote from the control group 2 and the working group, e.g. 20 to 50 m away. This drive group 1 may be set up in a street while the two other groups, i.e. the control group 2 and the working group 3 can be arranged inside a building.

The output demand on the drive group 3 is of the order of 10 to 20 HP for a satisfactory performance at the working tool 38 to be obtained, particularly for a hollow auger which can have a diameter of up to about 30 cm so as to enable large breaches to be made in concrete building walls or the like.

It will be appreciated that modifications may be made of the apparatus described above. Instead of drill bit it is possible to secure in the manner disclosed a back and forth movable saw or a grinding tool attached to the tool head 20.

Although the invention has been described with reference to specific example embodiments, it will be appreciated, that it is intended to cover all modifications and equivalents within the scope of the appended claims.

What is claimed is:

1. An apparatus for cutting concrete, stone or the like, comprising a transportable tool group including power driven tool means, a transportable reduced pressure and control group, and a transportable power drive group, said transportable tool group being adapted for the temporary attachment of said power driven tool means to work surface of any inclination including the horizontal and the vertical, said three groups being spaced apart, interconnectable and disconnectable from each other, said transportable tool group (3) comprising a rigid suction bell having a rim, a bearing surface on said rim adapted to face said work surface, a vacuum connection opening in said bell for evacuation of said bell, tool holding means for holding said power driven tool means, means for affixing said tool holding means in a rigid manner to said bell, said tool holding means comprising means for holding said power driven tool means laterally adjacent only one side of said bell, elastic sealing means on said bearing surface for sealingly engaging said work surface, and at least three supporting means rigidly affixed to said suction bell and extending beyond said bearing surface in a direction to space said bearing surface from said work surface whereby the deformation of said sealing means is precisely limited during the entire duration of said evacuation, said transportable tool group further including a drive motor (22) for driving said power driven tool means, and a feed advance unit (26) for said power driven tool means, said transportable reduced pressure producing and control group (2) including reduced pressure producing means (39) and control means (29, 34) for controlling the power supplied to said drive motor (22) and to said feed advance unit (26), and flexible as well as disconnectable fluid lines including pressure line means connectable to said motor and further including suction line means connectable to said suction bell for evacuating the latter, said transportable power drive group (1) comprising at least one motor and at least one pressure pump driven by said motor, at least two pressure lines and at least one electric cable for connecting the power drive group to said reduced pressure producing and control group, whereby said tool group is separately transportable from said reduced pressure producing and control group and also separately transportable from said power drive group.

2. The apparatus according to claim 1, for operation on a substantially horizontal supporting floor, wherein said portable tool group (3) comprises further support means (26', 27) extending substantially in parallel to said work surface and normal to said supporting floor.

3. The apparatus according to claim 2, wherein said further support means include wheels (26').

4. The apparatus according to claim 1, wherein each, said tool drive motor (22) and said feed advance unit (26), comprises a respective hydraulic drive motor.

* * * * *